US008383277B2

(12) United States Patent
Tezuka et al.

(10) Patent No.: US 8,383,277 B2
(45) Date of Patent: Feb. 26, 2013

(54) CONCENTRATION DISTRIBUTION ESTIMATION DEVICE FOR IMPURITY IN ANODE SIDE, AND FUEL CELL SYSTEM USING THE DEVICE

(75) Inventors: Takayoshi Tezuka, Susono (JP); Yoshihito Kanno, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 968 days.

(21) Appl. No.: 12/303,384

(22) PCT Filed: Feb. 29, 2008

(86) PCT No.: PCT/IB2008/000459
§ 371 (c)(1),
(2), (4) Date: Dec. 4, 2008

(87) PCT Pub. No.: WO2008/104865
PCT Pub. Date: Sep. 4, 2008

(65) Prior Publication Data
US 2009/0202877 A1    Aug. 13, 2009

(30) Foreign Application Priority Data

Mar. 1, 2007   (JP) .................................. 2007-051857

(51) Int. Cl.
*H01M 8/02* (2006.01)
(52) U.S. Cl. ...................................................... 429/400
(58) Field of Classification Search .................. None
See application file for complete search history.

(56) References Cited

U.S. PATENT DOCUMENTS

| 2004/0241504 A1* | 12/2004 | Summers et al. ............... 429/13 |
| 2005/0153181 A1* | 7/2005 | Saliger et al. .................... 429/22 |
| 2005/0181249 A1* | 8/2005 | Logan ............................. 429/22 |
| 2006/0223895 A1* | 10/2006 | Yoshida et al. ................. 521/27 |
| 2007/0009772 A1* | 1/2007 | Iio .................................. 429/13 |
| 2007/0231644 A1 | 10/2007 | Kanno |

FOREIGN PATENT DOCUMENTS

| JP | 9 312167 | 12/1997 |
| JP | 2003 317752 | 11/2003 |

(Continued)

OTHER PUBLICATIONS

Payne, R. U. et al., "Measurement of the Performance of a 47-Cell PEM Stack With Impurities in The Anode Feed Stream", AIChE Annu. Meet. Conf. Proc.; AIChE Annual Meeting, Conference Proceedings; 05AIChE: 2005 AIChE Annual Meeting and Fall Showcase, Conference Proceedings (2005) XP-002484660.

*Primary Examiner* — Patrick Ryan
*Assistant Examiner* — Wyatt McConnell
(74) *Attorney, Agent, or Firm* — Oblon, Spivak, McClelland, Maier & Neustadt, L.L.P.

(57) ABSTRACT

The standard permeation amount of an impurity substance, that is, the permeation amount per unit area of the impurity substance under a standard concentration is calculated from the gas pressures in the gas channels, the impedance, and the fuel cell temperature. The permeation index of the impurity substance at each of locations in the anode-side gas channel is calculated on the basis of the previously calculated value of the concentration distribution of the impurity substance. Then, on the basis of the standard permeation amount and the permeation index, the permeation amounts of the impurity substance at the locations in the anode-side gas channel are calculated. On the basis of a total of the permeation amounts, the amount of the impurity substance accumulated in the anode-side gas channel is calculated. Furthermore, the distribution of existence rate of the impurity substance in the anode-side gas channel is calculated on the basis of the gas pressure in the anode-side gas channel and the electric current value.

21 Claims, 4 Drawing Sheets

FOREIGN PATENT DOCUMENTS

| | | |
|---|---|---|
| JP | 2005 203143 | 7/2005 |
| JP | 2005 327597 | 11/2005 |
| JP | 2005 353303 | 12/2005 |
| JP | 2005 353569 | 12/2005 |
| JP | 2007 12532 | 1/2007 |
| WO | 2005 112167 | 11/2005 |

* cited by examiner

CONCENTRATION DISTRIBUTION ESTIMATION DEVICE FOR IMPURITY IN ANODE SIDE, AND FUEL CELL SYSTEM USING THE DEVICE

CROSS-REFERENCE TO PRIORITY APPLICATIONS

The present application claims priority to Japanese Patent Application No. 2007-051857 filed on Mar. 1, 2007, the entire contents of which are hereby incorporated herein by reference.

BACKGROUND OF THE INVENTION

1. Field of the Invention

The invention relates to a device that estimates the concentrating distribution of impurities in an anode-side gas channel of a fuel cell that generates electric power by being supplied with a fuel gas on the anode and with air on the cathode.

2. Description of the Related Art

Fuel cell systems that operate with a fuel gas held within an anode-side gas channel in a fuel cell (hereinafter, referred to as the anode dead-end type system) are known as proposed in, for example, Japanese Patent Application Publication No. 2005-353569 (JP-A-2005-353569), Japanese Patent Application Publication No. 2005-327597 (JP-A-2005-327597), Japanese Patent Application Publication No. 2003-317752 (JP-A-2003-317752), Japanese Patent Application Publication No. 2005-353303 (JP-A-2005-353303), Japanese Patent Application Publication No. 9-312167 (JP-A-9-312167), etc. In the anode dead-end type systems, impurity substances, such as nitrogen ($N_2$), water moisture, etc., accumulate in an anode-side gas channel of a fuel cell with the elapse of operation time. If such impurity substances cover the surface of a membrane-electrode assembly (MEA), the electromotive reaction on the electrode catalyst is impeded, resulting in a decline in voltage. Besides, the generated abnormal electric potential may degrade the membrane-electrode assembly (MEA). Therefore, in the related-art anode dead-end type systems, an exhaust valve is opened at an appropriate timing so that the impurity substances accumulated in the anode-side gas channel is exhausted from an end portion downstream of the anode to the outside of the fuel cell system.

In the related-art anode dead-end type system, when the exhaust valve is opened, the fuel gas in the anode-side gas channel as well as the impurity substances is emitted. Therefore, the frequent opening of the exhaust valve brings about degraded fuel economy, and therefore is not preferable. Besides, if the exhaust valve is opened when impurity substances are sufficiently accumulated in a downstream end portion of the anode-side gas channel, the amount of the fuel gas that is wastefully emitted can be correspondingly restrained. Hence, from a viewpoint of improving the fuel economy, it is preferable that the frequency of opening the exhaust valve be restrained as much as possible.

On the other hand, from a viewpoint of maintaining the fuel cell performance, the concentrated accumulation of impurity substances in the downstream end portion of the anode-side gas channel is not preferable. This is because the concentrated accumulation of impurity substances causes decline in the output voltage and degradation of the membrane-electrode assembly as stated above. That is, with regard to the related-art anode dead-end type system, it is demanded to simultaneously accomplish the two contrary tasks, that is, prevention of the decline in the fuel cell performance resulting from accumulation of impurity substances, and the improvement of the fuel economy by restraining the amount of emission of the fuel gas.

However, it is not easy to fulfill the foregoing requirements in the related-art anode dead-end type system. In order to fulfill the requirements, it is necessary to open the exhaust valve according to the situation of accumulation of impurity substances in the downstream end portion of the anode-side gas channel. However, a method for accurately estimating the situation of the accumulation has not bee established. Besides, the estimation of the situation of the accumulation demanded herein is not a mere estimation of the amount of accumulation of impurity substances. In order to reliably emit impurity substances while preventing wasteful emission of the fuel gas, it becomes necessary to estimate where in the anode-side gas channel impurity substances exist and what amount of impurity substances exist, that is, to estimate the concentration distribution of impurity substances in the anode-side gas channel.

SUMMARY OF THE INVENTION

The invention has been accomplished in view of the foregoing tasks, and provides an estimation device that is able to accurately estimate the concentration distribution of impurity substances in the anode-side gas channel, and a fuel cell system that, by using the estimation device, is able to both prevent the decline in the fuel cell performance resulting from the accumulation of impurity substances in the anode-side gas channel and restrain the amount of the fuel gas emitted to the outside of the fuel cell system.

According to one aspect of the invention, there is provided a concentration distribution estimation device for a fuel cell that has an anode and a cathode on opposite sides of an electrolyte membrane and that generates electric power by being supplied with a fuel gas on the anode and being supplied with air on the cathode. The device estimates a concentration distribution of an impurity substance in a gas channel on an anode side in the fuel cell. The estimation device includes: an impurity substance amount estimation device that calculates by estimation an amount of an impurity substance existing in the anode-side gas channel; an impurity substance distribution estimation device that calculates by estimation a distribution of existence rate of the impurity substance in the anode-side gas channel; and a concentration distribution calculation device that calculates the concentration distribution of the impurity substance in the anode-side gas channel based on the amount of the impurity substance estimated by the impurity substance amount estimation device and the distribution of existence rate of the impurity substance estimated by the impurity substance distribution estimation device.

According to the above-described estimation device, since the amount of the impurity substance existing in the anode-side gas channel and the distribution of existence rate thereof are calculated by estimation, the concentration distribution of the impurity substance in the anode-side gas channel can be accurately estimated on the basis of the results of the estimation.

In the foregoing estimation device, it is also preferred that the impurity substance distribution estimation device include: a pressure measurement device that measures gas pressure in the anode-side gas channel; a flow rate-related quantity measurement device that measures a physical quantity related to the flow rate distribution of the fuel gas in the anode-side gas channel; and an existence rate calculation device that calculates an existence rate of the impurity substance at each of locations in the anode-side gas channel based on a measured value from the pressure measurement device and a measured value from the flow rate-related quantity measurement device.

According to the estimation device described above, since the gas pressure in the anode-side gas channel and a physical quantity related to the flow rate distribution of the fuel gas in the anode-side gas channel are measured, the existence rates of the impurity substance at the locations in the anode-side gas channel can be accurately calculated on the basis of those measured values. That is, it becomes possible to calculate by estimation the distribution of existence rate of the impurity substance in the anode-side gas channel with high accuracy.

In the estimation device, it is also preferred that the flow rate-related quantity measurement device measure an electric current value of the fuel cell.

According to the estimation device described above, since the electric current value of the fuel cell is measured, the flow rate distribution of the fuel gas in the anode-side gas channel can be estimated easily and accurately.

Furthermore, in the estimation device, it is also preferred that the impurity substance amount estimation device include: a permeation amount-related quantity measurement device that measures a physical quantity related to a permeation amount per unit area of the impurity substance permeating through the electrolyte membrane from a cathode side to an anode side; a standard permeation amount calculation device that calculates a standard permeation amount that is the permeation amount per unit area under a standard concentration based on a measured value from the permeation amount-related quantity measurement device; a permeation index calculation device that calculates a permeation index of the impurity substance at each location in the anode-side gas channel based on the concentration distribution of the impurity substance calculated by the concentration distribution calculation device; a permeation amount calculation device that calculates the permeation amount of the impurity substance at each location in the anode-side gas channel based on the standard permeation amount calculated by the standard permeation amount calculation device and the permeation index calculated by the permeation index calculation device; and a total permeation amount calculation device that calculates a total permeation amount of the impurity substance permeating through the electrolyte membrane based on the permeation amount at each location in the anode-side gas channel calculated by the permeation amount calculation device.

According to the estimation device described above, the ease of permeation when the impurity substance permeates through the electrolyte membrane is calculated as the permeation index, and, on the basis of the calculated permeation index, the permeation amounts of the impurity substance at the locations in the anode-side gas channel are calculated. Therefore, it becomes possible to highly accurately calculate by estimation the amount of the impurity substance existing in the anode-side gas channel. Furthermore, since the permeation index is calculated on the basis of the concentration distribution of the impurity substance in the anode-side gas channel, the influence that the concentration of the impurity substance has on the ease of permeation of the impurity substance can be accurately reflected in the calculation of the permeation amount. Therefore, in a situation where the concentration distribution in the impurity substance in the anode-side gas channel is changing every moment due to the impurity substance coming through the electrolyte membrane from the cathode side, the moment-to-moment changes in the concentration distribution can be accurately estimated.

Furthermore, in the estimation device, it is also preferred that the permeation amount-related quantity measurement device measure impedance of the fuel cell.

According to the estimation device described above, since the impedance of the fuel cell is measured, the permeation amount per unit area of the impurity substance permeating through the electrolyte membrane from the cathode side to the anode side can be easily and accurately estimated.

Furthermore, in the estimation device, it is also preferred that the permeation amount-related quantity measurement device measure temperature of the fuel cell.

According to the estimation device described above, since the temperature of the fuel cell is measured, the permeation amount per unit area of the impurity substance permeating through the electrolyte membrane from the cathode side to the anode side can be easily and accurately estimated.

Furthermore, it is also preferred that the permeation amount-related quantity measurement device measure gas pressure in the anode-side gas channel and gas pressure in the cathode-side gas channel.

According to the estimation device described above, since the gas pressure in the anode-side gas channel and the gas pressure in the cathode-side gas channel are measured, the permeation amount per unit area of the impurity substance permeating through the electrolyte membrane from the cathode side to the anode side can be easily and accurately estimated.

Furthermore, in the estimation device, it is also preferred that the impurity substance amount estimation device include: an information acquisition device that acquires information about purity of the fuel gas; a flow amount-related quantity measurement device that measures a physical quantity related to amount of flow of the fuel gas flowing into the anode-side gas channel; and an inflow amount calculation device that calculates amount of the impurity substance flowing into the anode-side gas channel together with the fuel gas based on the information about the purity of the fuel gas acquired by the information acquisition device and a measured value from the flow amount-related quantity measurement device.

According to the estimation device described above, since information about the purity of the fuel gas is acquired and a physical quantity related to the amount of flow of the fuel gas flowing into the anode-side gas channel is measured, the amount of the impurity substance flowing into the anode-side gas channel together with the fuel gas can be calculated on the basis of the acquired information and the measured value. According to this construction, even in the case where the fuel gas originally contains an impurity substance, the amount of the impurity substance existing in the anode-side gas channel can be highly accurately calculated by estimation.

Furthermore, in the estimation device, it is also preferred that a downstream end portion of the anode-side gas channel be substantially stopped.

According to the estimation device described above, in a fuel cell in which the downstream end portion of the anode-side gas channel is substantially stopped, the concentration distribution of the impurity substance accumulated in the anode-side gas channel can be accurately estimated. In such a fuel cell, the concentration distribution of impurity substances in the anode-side gas channel change every moment, and the concentration distribution thereof greatly changes depending on the operation state of the fuel cell. If in such a fuel cell, the concentration distribution of the impurity substances can be accurately estimated, it becomes possible to precisely determine the timing of opening the downstream end portion of the anode-side gas channel to emit the gas to the outside of the fuel cell system and also precisely determine the amount of emission.

Furthermore, in the estimation device, it is also preferred that a very small amount of a gas in comparison with amount of the fuel gas consumed in the anode-side gas channel be emitted from a downstream end portion of the anode-side gas channel to outside a fuel cell system.

According to the estimation device described above, in a fuel cell where a very small amount of a gas in comparison with amount of the fuel gas consumed in the anode-side gas channel be emitted from a downstream end portion of the anode-side gas channel to outside a fuel cell system, it becomes possible to accurately estimate the concentration distribution of an impurity substance accumulated in the anode-side gas channel. In such a fuel cell, the impurity substance that accumulates in the end portion downstream of the anode can be emitted little by little to the outside of the fuel cell system. Therefore, if the concentration distribution of the impurity substance in the fuel cell can be accurately estimated, the amount of emission of gas to the outside of the fuel cell system from the downstream end portion of the anode-side gas channel can be changed in accordance with the concentration distribution of the impurity substance. Therefore, it becomes possible to prevent both the decline in the fuel cell performance caused by insufficient emission and the waste of the fuel gas caused by excessive emission.

According to another aspect of the invention, there is provided fuel cell system that includes: a fuel cell that has an anode and a cathode on opposite sides of an electrolyte membrane and that generates electric power by being supplied with a fuel gas on the anode and being supplied with air on the cathode; an exhaust mechanism that emits a gas that has passed through a gas channel on an anode side to outside the fuel cell system; an impurity substance amount estimation device that estimates by calculation an amount of an impurity substance existing in the anode-side gas channel; an impurity substance distribution estimation device that estimates by calculation a distribution of existence rate of the impurity substance in the anode-side gas channel; a concentration distribution calculation device that calculates the concentration distribution of the impurity substance in the anode-side gas channel based on the amount of the impurity substance estimated by the impurity substance amount estimation device and the distribution of existence rate of the impurity substance estimated by the impurity substance distribution estimation device; and a control device that controls operation of the exhaust mechanism based on the concentration distribution of the impurity substance calculated by the concentration distribution calculation device.

According to the fuel cell system described above, since the amount of the impurity substance existing in the anode-side gas channel and the distribution of existence rate thereof are calculated by estimation, the concentration distribution of the impurity substance in the anode-side gas channel can be accurately estimated on the basis of results of the estimated calculation. Then, since the operation of the exhaust mechanism is controlled on the basis of the estimated concentration distribution of the impurity substance, the fuel cell system can prevent both the accumulation of the impurity substance caused by insufficient emission to reach such a level as to bring about a decline in the fuel cell performance and the wasteful emission of the fuel gas caused by excessive emission.

In the fuel cell system, it is also preferred that a downstream side of the anode-side gas channel be terminated by the exhaust mechanism.

According to the fuel cell system described above, the fuel cell can be operated while the fuel gas is held within the anode-side gas channel by closing the exhaust mechanism, and the impurity substance gas accumulated in the anode-side gas channel can be emitted to the outside of the fuel cell system by opening the exhaust mechanism.

In the fuel cell system, it is also preferred that the control device control operation of the exhaust mechanism so that a very small amount of a gas in comparison with amount of the fuel gas consumed in the anode-side gas channel is emitted to outside the fuel cell system and amount of emission is changed in accordance with the concentration distribution of the impurity substance.

According to the fuel cell system, since a very small amount of the gas in comparison with amount of the fuel gas consumed in the anode-side gas channel is emitted to the outside of the fuel cell system, the impurity substance that accumulates in the end portion downstream of the anode can be emitted little by little to the outside of the fuel cell system. Furthermore, since the amount of emission is changed in accordance with the concentration distribution of the impurity substance, it is possible to prevent the decline in the fuel cell performance caused by insufficient emission, and also prevent the waste of the fuel gas caused by excessive emission.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in greater detail with reference to example embodiments. With reference to FIGS. 1 to 5, a first embodiment of the invention will be described below.

Figure 1:
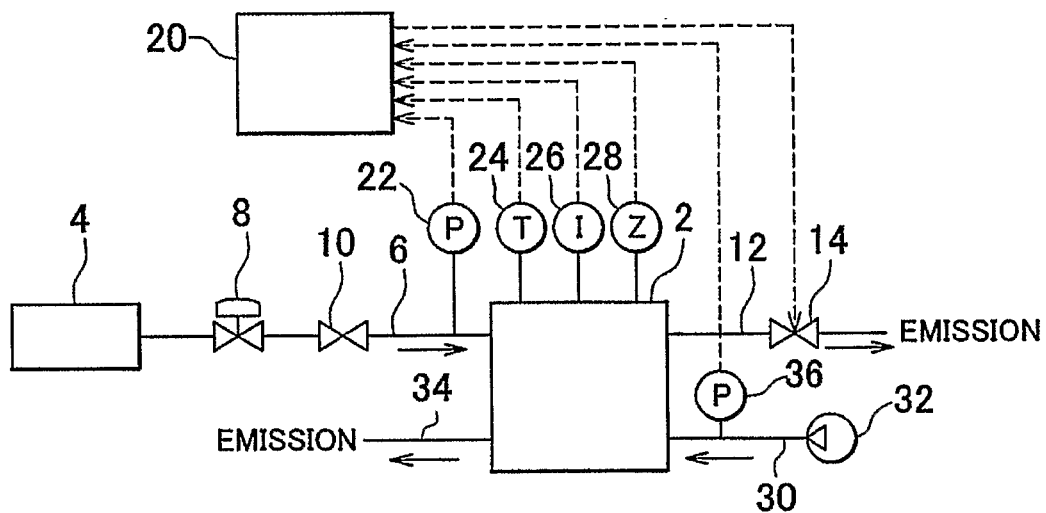
FIG. 1 is a diagram schematically showing a construction of a fuel cell system of a first embodiment of the invention.

FIG. 1 is a diagram schematically showing the construction of a fuel cell system to which the invention is applied. The fuel cell system generates electric power by a fuel cell 2, and supplies the electric power to loads such as electric motors and the like. Normally, the fuel cell 2 is used in the form of a fuel cell stack obtained by stacking a plurality of unit cells. The unit cells, although not shown in the drawings, have a construction in which a membrane-electrode assembly is sandwiched by a pair of electric current collecting plates. The membrane-electrode assembly is formed by integrating a solid polymer electrolyte membrane with catalysts integrated to the two opposite surfaces thereof, and further integrating a gas diffusion layer to each of the two surfaces. Each current collecting plate also functions as a separator that separate two adjacent membrane-electrode assemblies. Each unit cell is constructed so as to be supplied with hydrogen as a fuel gas on the anode and be supplied with air on the cathode and therefore generate electric power.

A hydrogen supply pipe 6 for supplying hydrogen from a hydrogen tank 4 to the fuel cell 2 is connected to the fuel cell 2. An intermediate portion of the hydrogen supply pipe 6 is provided with a hydrogen pressure regulating valve 8 and a hydrogen inlet valve 10 which are disposed in that order from an upstream side. Hydrogen is decompressed by a pressure regulating valve 8 and is thus adjusted to a desired pressure before being supplied to the fuel cell 2. The hydrogen supplied to the fuel cell 2 is distributed to the anode of each unit cell via a supply manifold (not shown) that is formed in the fuel cell 2.

The fuel cell system of the first embodiment includes an exhaust pipe 12 for drawing out an anode gas from the fuel cell 2. The exhaust pipe 12 is connected to a downstream-side end portion of an anode-side gas channel of each unit cell via an exhaust manifold (not shown) that is formed in the fuel cell 2. The gas in the anode-side gas channel (anode gas) is collected in the exhaust manifold, and is discharged into the exhaust pipe 12. A distal end of the exhaust pipe 12 is open to the atmosphere, or is connected to a diluter.

The exhaust pipe 12 is provided with an electromagnetic type exhaust valve 14 capable of being duty-controlled, as an exhaust mechanism that changes the state of communication of the exhaust pipe 12. The exhaust valve 14 is preferably of an injector type, which is excellent in the flow amount controllability. The amount of emission of the anode gas that is emitted from the anode-side gas channel to the outside of the fuel cell system can be controlled by the duty ratio of the exhaust valve 14. In the fuel cell system of the first embodiment, the duty control of the exhaust valve 14 is performed so that a very small amount of flow of the anode gas, in comparison with the amount of hydrogen consumed in the anode-side gas channel, is emitted to the outside of the fuel cell system (continuous small-amount emission).

Furthermore, an air supply pipe 30 for supplying air is connected to the fuel cell 2. An air pump 32 is disposed on the air supply pipe 30. Due to the action of the air pump 32, air is taken into the air supply pipe 30, and is supplied to the fuel cell 2. The air supplied to the fuel cell 2 is distributed to the cathode of each unit cell via a supply manifold formed in the fuel cell 2. The air that has passed through the cathode of each unit cell is collected in an exhaust manifold formed in the fuel cell 2, and is discharged into the exhaust pipe 34.

The operation of the exhaust valve 14 is controlled by a control device 20. Various sensors are connected to the control device 20, including a pressure sensor 22, a temperature sensor 24, an ammeter 26, an impedance meter 28 and a pressure sensor 36. The pressure sensor 22 is attached to the entrance of the hydrogen supply pipe 6 to the fuel cell 2 so as to measure the gas pressure in the anode-side gas channel. The pressure sensor 36 is attached to the entrance of the air supply pipe 30 to the fuel cell 2 so as to measure the gas pressure in the cathode-side gas channel. The temperature sensor 24 is attached to the fuel cell 2 so as to measure the temperature of the fuel cell 2. The ammeter 26 is attached to the fuel cell 2 so as to measure the value of current of the fuel cell 2. The impedance meter 28 is attached to the fuel cell 2 so as to measure the impedance of the fuel cell 2.

Figure 2:
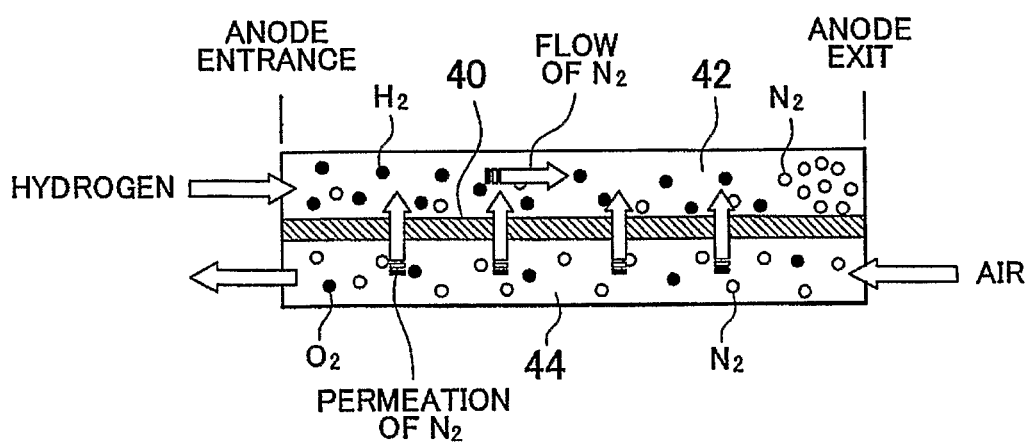
FIG. 2 is a diagram schematically showing an internal structure of a unit cell in the first embodiment and a phenomenon that occurs in the unit cell.

FIG. 2 is a diagram schematically showing an internal construction of a unit cell constituting the fuel cell 2, and a phenomenon that occurs in the unit cell. In FIG. 2, portions that pertain particularly to features of the invention are shown, and portions, such as the current collectors, manifolds, etc., which are other than the features of the invention, are omitted from the illustration. Hereinafter, description will be given with reference to FIG. 2 as well as FIG. 1.

As shown in FIG. 2, in the unit cell, gas channels 42, 44 are formed along the two side surfaces of the membrane-electrode assembly 40. The gas channel 42 on the anode side of the membrane-electrode assembly 40 is supplied with hydrogen. The gas channel 44 on the cathode side of the membrane-electrode assembly 40 is supplied with air. Incidentally, there is no particular limitation on the shape or construction of the gas channels 42, 44. For example, the gas channels 42, 44 may be grooves that are formed on surfaces of the current collectors (separators). Alternatively, the gas channels 42, 44 may be formed by pores that continuously extend in porous body layers made up of an electrically conductive material which are provided between the membrane-electrode assembly 40 and the current collectors.

The air supplied to the cathode-side gas channel 44 contains nitrogen ($N_2$) besides oxygen ($O_2$), which is used for the power generation. Nitrogen is an inert gas, and is not used for the power generation, but is directly emitted from the cathode-side gas channel 44 to the outside of the fuel cell system. However, a portion of the nitrogen permeates through the membrane-electrode assembly 40 and enters the anode-side gas channel 42 as schematically shown by an arrows in FIG. 2. What serves as a driving force that moves the nitrogen to the anode-side gas channel 42 side is the difference in the partial pressure of nitrogen between the cathode-side gas channel 44 and the anode-side gas channel 42. The nitrogen ($N_2$) that has passed through the membrane-electrode assembly 40 is carried downstream in the anode-side gas channel 42 by the flow of hydrogen ($H_2$) in the anode-side gas channel 4 as schematically shown by an arrow in FIG. 2.

Naturally, nitrogen is not used for the power generation on the anode side, either. Therefore, in the case where the exhaust valve 14 is closed and the downstream end of the anode-side gas channel 42 is stopped, nitrogen gradually accumulates in a downstream end portion of the anode-side gas channel 42 as schematically shown in FIG. 2. If nitrogen covers the surface of the membrane-electrode assembly 40, the electromotive reaction on the catalyst is impeded, bringing about a decline in voltage or the degradation of the membrane-electrode assembly 40 due to abnormal electric potential. Incidentally, air contains impurity substances other than nitrogen that are not used for the power generation, such as water vapor, carbon dioxide, etc. However, the concentrations of those substances in air are very small as compared with that of nitrogen, attention is focused only on nitrogen herein as an impurity substance. However, this does not mean to exclude substances other than nitrogen from the impurity substances that are assumed in the invention.

In this respect, in the fuel cell system of the fast embodiment, nitrogen in the anode-side gas channel 42 can be emitted together with hydrogen to the outside of the fuel cell system by duty-control of the exhaust valve 14. However, depending on the setting of the duty ratio, there is possibility that emission may become excessive so that hydrogen is wastefully emitted, or emission may become insufficient and therefore nitrogen may accumulate to such a level as to bring about decline in the fuel cell performance. Therefore, in the fuel cell system of the first embodiment, in order to cause the amount of emission from the anode-side gas channel 42 to the outside of the fuel cell system to become an appropriate amount, the exhaust valve 14 is duty-controlled while the concentration distribution of nitrogen in the anode-side gas channel 42 is taken into account.

Figure 3:
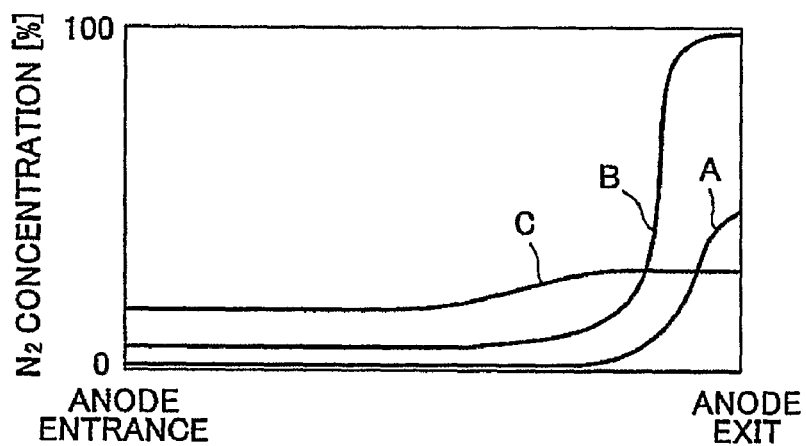
FIG. 3 is a diagram showing concentration distributions of nitrogen ($N_2$) in an anode-side gas channel in the first embodiment.

FIG. 3 is a diagram showing an example of the nitrogen concentration distribution in the anode-side gas channel 42 in the case where the fuel cell 2 is operated with the exhaust valve 14 closed. Since the exhaust valve 14 is closed, nitrogen accumulates in the anode-side gas channel 42. In FIG. 3, a line A shows the concentration distribution of nitrogen in the case where the amount of accumulated nitrogen is small, and a line B shows the concentration distribution of nitrogen in the case where the amount of accumulation thereof is large. If the actual nitrogen concentration distribution is a distribution as shown by the line A, hydrogen has sufficiently spread to the downstream end portion of the anode-side gas channel 42, and therefore the duty ratio when the exhaust valve 14 is to be opened may be small. On the other hand, if the actual nitrogen concentration distribution is a distribution as shown by the line B, there is a need to set the duty ratio of the exhaust valve 14 large so as to rapidly emit the nitrogen accumulated in the downstream end portion.

A reason why the fuel cell system of the first embodiment performs the duty control of the exhaust valve 14 on the basis of the concentration distribution of nitrogen instead of merely the amount of accumulated nitrogen is that the accumulation of nitrogen does not always concentrates in the downstream end portion of the anode-side gas channel 42. For example, there can be a case where nitrogen is distributed substantially uniformly in the anode-side gas channel 42, as shown by a line C in FIG. 3. In the case of the concentration distribution shown by the line C, hydrogen has sufficiently spread to the downstream end portion of the anode-side gas channel 42 despite the large amount of nitrogen accumulated in the anode-side gas channel 42. In this situation, if the duty ratio of the exhaust valve 14 is set large, hydrogen will be wastefully emitted.

The concentration distribution of nitrogen in the anode-side gas channel 42 is determined by the amount of nitrogen accumulated in the anode-side gas channel 42 and the distribution of the existence rate of nitrogen in the anode-side gas channel 42. The multiplication product of the amount of accumulation of nitrogen by the distribution of the existence rate thereof corresponds to the concentration distribution of nitrogen. In FIG. 3, the concentration distribution shown by the line A and the concentration distribution shown by the line B are the same in the distribution of the existence rate of nitrogen but are different in the amount of accumulation of nitrogen. On another hand, the concentration distribution shown by the line A and the concentration distribution shown by the line C are the same in the amount of accumulation of nitrogen but are different in the distribution of the existence rate of nitrogen. In reality, neither the amount of accumulation of nitrogen nor the distribution of the existence rate of nitrogen can be directly measured. However, if they are accurately estimated, it becomes possible to accurately estimate the concentration distribution of nitrogen in the anode-side gas channel 42. Hereinafter, a method of calculating by estimation the distribution of the existence rate of nitrogen in the anode-side gas channel 42, and a method of calculating by estimation the amount of accumulation of nitrogen in the anode-side gas channel 42 will be described.

In the fuel cell system of the first embodiment, the distribution of the existence rate of nitrogen in the anode-side gas channel 42 is calculated by estimation by the following method. Firstly, the distribution of the existence rate of nitrogen in the anode-side gas channel 42 is determined by the flow of nitrogen in the anode-side gas channel 42. Specifically, in a region where nitrogen is flowing in a downstream direction, the existence rate of nitrogen necessarily becomes higher downstream than upstream. Then, the flow of nitrogen in the anode-side gas channel 42 is greatly affected by the flow rate distribution of hydrogen in the anode-side gas channel 42. In a region of large flow rate of hydrogen, the hydrogen coming through the membrane-electrode assembly 40 is carried downstream in the anode-side gas channel 42. On the other hand, in a region of small flow rate of hydrogen, the nitrogen diffuses upstream as well, so that the downstream flow of nitrogen is restrained.

Figure 4:
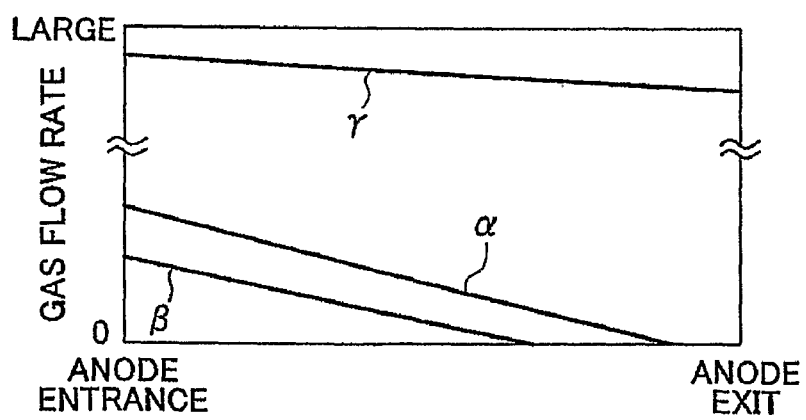
FIG. 4 is a diagram showing distributions of the gas flow rate in the anode-side gas channel in the first embodiment.

FIG. 4 is a diagram showing an example of the flow rate distribution of hydrogen in the anode-side gas channel 42. In FIG. 4, a line α and a line β show the flow rate distributions of hydrogen in the case where the downstream end portion of the anode-side gas channel 42 is, substantially stopped. In the case where the exhaust valve 14 is completely closed or the case where the exhaust valve 14 is duty-controlled so that a very small amount of flow of the anode gas in comparison with the amount of hydrogen consumed in the anode-side gas channel 42 is emitted to the outside of the fuel cell system, the flow rate distribution becomes as shown by the line α or the line β. On the other hand, a line γ shows the flow rate distribution of hydrogen in the case where the downstream end portion of the anode-side gas channel 42 is open. For example, in the case of a circulation type system in which the hydrogen that has passed through the anode-side gas channel 42 is returned into the anode-side gas channel 42, the flow rate distribution of hydrogen is as shown in the line γ.

The flow of nitrogen in the anode-side gas channel 42 is also affected by the gas pressure in the anode-side gas channel 42. Specifically, the diffusion rate of nitrogen is dependent on the gas pressure in the anode-side gas channel 42. The nitrogen that has passed through the membrane-electrode assembly 40 diffuses in the anode-side gas channel 42. The relative relation between the diffusion rate of nitrogen and the flow rate of hydrogen determines how nitrogen flows in the anode-side gas channel 42.

From the foregoing discussion, it suffices to measure the flow rate distribution of hydrogen in the anode-side gas channel 42 and the gas pressure in the anode-side gas channel 42, in order to estimate the distribution of the existence rate of nitrogen in the anode-side gas channel 42. It is to be noted herein that in the fuel cell system of the first embodiment, the flow rate distribution of hydrogen in the anode-side gas channel 42 is not directly measured, but the value of output electric current of the fuel cell 2 is measured as a physical quantity related to the flow rate distribution of hydrogen. The flow rate distribution of hydrogen in the anode-side gas channel 42 is univocally determined by the flow rate of hydrogen flowing into the anode-side gas channel 42. Then, the flow rate of hydrogen flowing into the anode-side gas channel 42 is univocally determined by the output electric current of the fuel cell 2. If the electric current value and the anode gas pressure are measured, the existence rates of nitrogen at various locations in the anode-side gas channel 42 can be calculated on the basis of those measured values.

Next, the method of calculating by estimation the amount of accumulation of nitrogen in the anode-side gas channel 42 will be described. Firstly, most of the nitrogen in the anode-side gas channel 42 has passed through the membrane-electrode assembly 40, so that the amount of accumulation of nitrogen can be expressed as an integrated value of the amount of permeation of nitrogen. Therefore, if the amount of permeation of nitrogen per unit time can be calculated, it is possible to find the amount of accumulation of nitrogen by calculation.

The amount of permeation of nitrogen (the amount of permeation thereof per unit time) is determined by the water content of the membrane-electrode assembly 40, the temperature of the fuel cell 2, and the partial pressure difference of nitrogen between the cathode-side gas channel 44 and the anode-side gas channel 42. The partial pressure of nitrogen in the anode-side gas channel 42 is determined by the gas pressure and the nitrogen concentration in the anode-side gas channel 42. The nitrogen concentration in the anode-side gas channel 42 is distributed as described above. Therefore, the partial pressure of nitrogen is not uniform in the anode-side gas channel 42, so that the amount of permeation of nitrogen varies depending on the location in the anode-side gas channel 42. Hence, in the first embodiment, the nitrogen permeation amount (total permeation amount) per unit time in the entire anode-side gas channel 42 can be calculated using the following equation (1):

$$\text{Total permeation amount} = \Sigma C_i \times \text{standard permeation amount} \quad (1)$$

In the equation (1), the standard permeation amount means the amount of permeation per unit area under a predetermined standard nitrogen concentration. If the nitrogen concentration is constant, the amount of permeation of nitrogen is determined by the water content of the membrane-electrode assembly 40, the temperature of the fuel cell 2, the gas pressure in the anode-side gas channel 42 and the gas pressure in the cathode-side gas channel 44. Therefore, the standard permeation amount can be expressed as a function of a physical quantity related to the water content, the fuel cell temperature, and the aforementioned gas pressures.

Furthermore, in the equation (1), $C_i$ means the permeation index of nitrogen. In this first embodiment, the interior of the anode-side gas channel 42 is divided into mesh grids of unit area, and the permeation index $C_i$ is set separately for each mesh grid. The permeation index $C_i$ shows the ease or degree of ease of permeation of nitrogen in a mesh grid, and the value obtained by multiplying the standard permeation amount by the permeation index $C_i$ is the amount of permeation of nitrogen in the mesh grid. The value obtained by integrating the permeation amount in each mesh grid ($C_i \times$ standard permeation amount) becomes the total permeation amount of nitrogen in the entire anode-side gas channel 42. Since the ease of permeation of nitrogen in a mesh grid is determined by the nitrogen concentration in the mesh grid, the permeation index $C_i$ can be expressed as a function of the nitrogen concentration. If the concentration distribution of nitrogen in the anode-side gas channel 42 is determined, the permeation indexes $C_i$ at various locations in the anode-side gas channel 42 can be determined on the basis of the nitrogen concentration distribution.

From the foregoing discussion, it suffices to measure a physical quantity related to the water content of the membrane-electrode assembly 40, the fuel cell temperature, and the gas pressures in the gas channels 42, 44, in order to estimate the amount of accumulation of nitrogen in the anode-side gas channel 42. The physical quantity related to the water content of the membrane-electrode assembly 40 may be the impedance of the fuel cell 2. If the impedance, the fuel cell temperature, and the gas pressures are measured, the standard permeation amount can be calculated on the basis of those measured values. As for the concentration distribution of nitrogen for calculating the permeation index $C_i$ at each location in the anode-side gas channel 42, it suffices to use the previously calculated value. Alternatively, on the assumption that the concentration distribution of nitrogen and the distribution of the existence rate of nitrogen are similar, the permeation index $C_i$ may be calculated from the anode gas pressure and the electric current value.

In the fuel cell system of the first embodiment, the calculation of the concentration distribution of nitrogen in the anode-side gas channel 42 is performed by the control device 20. The control device 20 performs the duty control of the exhaust valve 14 on the basis of the calculated concentration distribution of nitrogen. Hereinafter, a concrete routine for calculated estimation of the nitrogen concentration distribution which is carried out by the control device 20 will be described with reference to the flowchart of FIG. 5.

Figure 5:
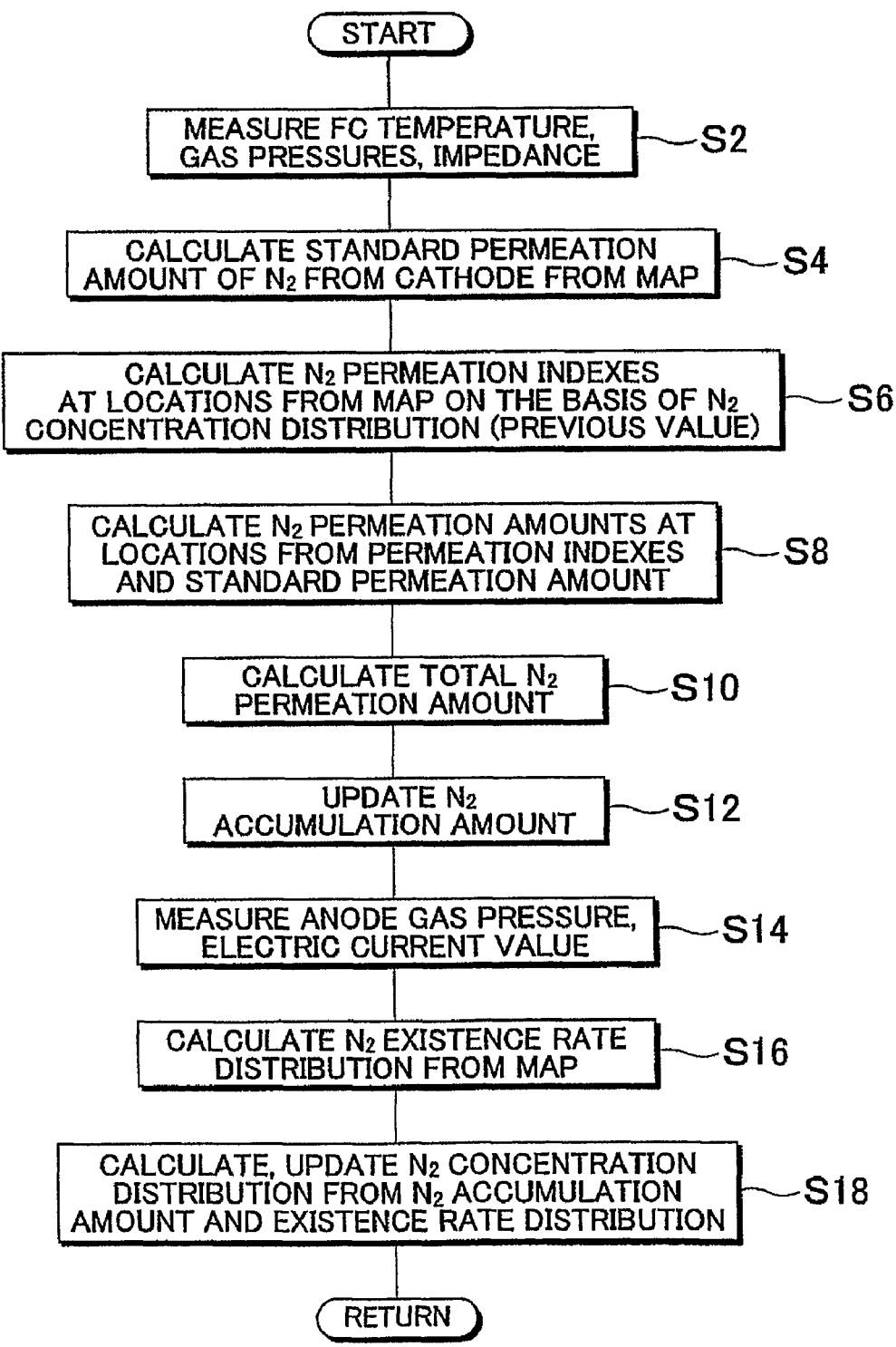
FIG. 5 is a flowchart showing a routine for estimated calculation of the nitrogen concentration distribution which is carried out in the first embodiment.

In the routine shown in FIG. 5, firstly in step S2, the temperature of the fuel cell 2 (FC temperature), the gas pressures in the gas channels 42, 44, and the impedance are measured. In step S4, the standard permeation amount of nitrogen is calculated by using a standard permeation amount map prepared beforehand. In the standard permeation amount map, relationships among the standard permeation amount, the FC temperature, the gas pressures and the impedance are prescribed.

Subsequently in step S6, the permeation indexes at various locations in the anode-side gas channel 42 are calculated by using a permeation index map prepared beforehand. In the permeation index map, a relationship between the permeation index and the nitrogen concentration is prescribed. The permeation indexes at various locations can be derived by applying the value of the nitrogen concentration distribution previously calculated in the routine to the permeation index map.

Subsequently in step S8, the amount of permeations of nitrogen at the various locations in the anode-side gas channel 42 are calculated from the permeation index calculated in step S6 and the standard permeation amount calculated in step S4. Then, in step S10, the total permeation amount of nitrogen in the entire anode-side gas channel 42 is calculated by integrating the permeation amounts at the various locations. In step S12, the amount of accumulation of nitrogen is updated with the total permeation amount calculated in step S10.

Subsequently in step S14, the gas pressure in the anode-side gas channel 42 and the value of electric current of the fuel cell 2 are measured. In step S16, the distribution of the existence rate of nitrogen is calculated by using a nitrogen distribution map prepared beforehand. In the nitrogen distribution map, relationships among the existence rates of nitrogen at the various locations, the anode-side gas channel 42, the anode gas pressure, and the electric current value are prescribed.

Subsequently in step S18, the concentration distribution of nitrogen in the anode-side gas channel 42 is calculated from the amount of accumulation of nitrogen updated in step S12 and the distribution of the existence rate of nitrogen calculated in step S16. The control device 20 determines the duty ratio of the exhaust valve 14 on the basis of the concentration distribution of nitrogen calculated in step S18.

According to the estimated calculation of the nitrogen concentration distribution by the foregoing routine, the ease of permeation of nitrogen through the membrane-electrode assembly 40 is calculated as a permeation index, and the amount of permeation of nitrogen at each location in the anode-side gas channel 42 is calculated on the basis of the calculated permeation index. Therefore, the amount of nitrogen existing in the anode-side gas channel 42 can be calculated by estimation with high accuracy. Furthermore, since the permeation index is calculated on the basis of the concentration distribution of nitrogen (the previous value) in the anode-side gas channel 42, the influence that the nitrogen concentration has on the ease of permeation of nitrogen can be accurately reflected in the calculation of the permeation amount. Besides, since the gas pressure in the anode-side gas channel 42 and the value of electric current of the fuel cell 2 are measured, the existence rate of nitrogen at each location in the anode-side gas channel 42 can be accurately calculated on the basis of those measured values. Since the amount of permeation of nitrogen and the distribution of the existence rate of nitrogen accurately calculated by estimation are used as bases to calculate the concentration distribution of nitrogen, changes in the concentration distribution can be accurately estimated in a situation where the concentration distribution of nitrogen in the anode-side gas channel 42 is changing every moment due to the nitrogen coming through the membrane-electrode assembly 40.

The fuel cell system of the first embodiment is a system that is able to emit the nitrogen accumulating in the downstream end portion of the anode-side gas channel 42 to the outside of the fuel cell system little by little by duty-controlling the exhaust valve 14. In the fuel cell system, if the concentration distribution of nitrogen is accurately estimated and the duty ratio of the exhaust valve 14 is determined on the basis of the estimated distribution, the amount of gas emitted from the downstream end portion of the anode-side gas channel 42 to the outside of the fuel cell system can be changed according to the concentration distribution of nitrogen, and therefore it becomes possible to prevent both the decline in the fuel cell performance caused by insufficient emission and the waste of hydrogen caused by excessive emission.

A second embodiment of the invention will be described hereinafter with reference to FIG. 6.

Figure 6:
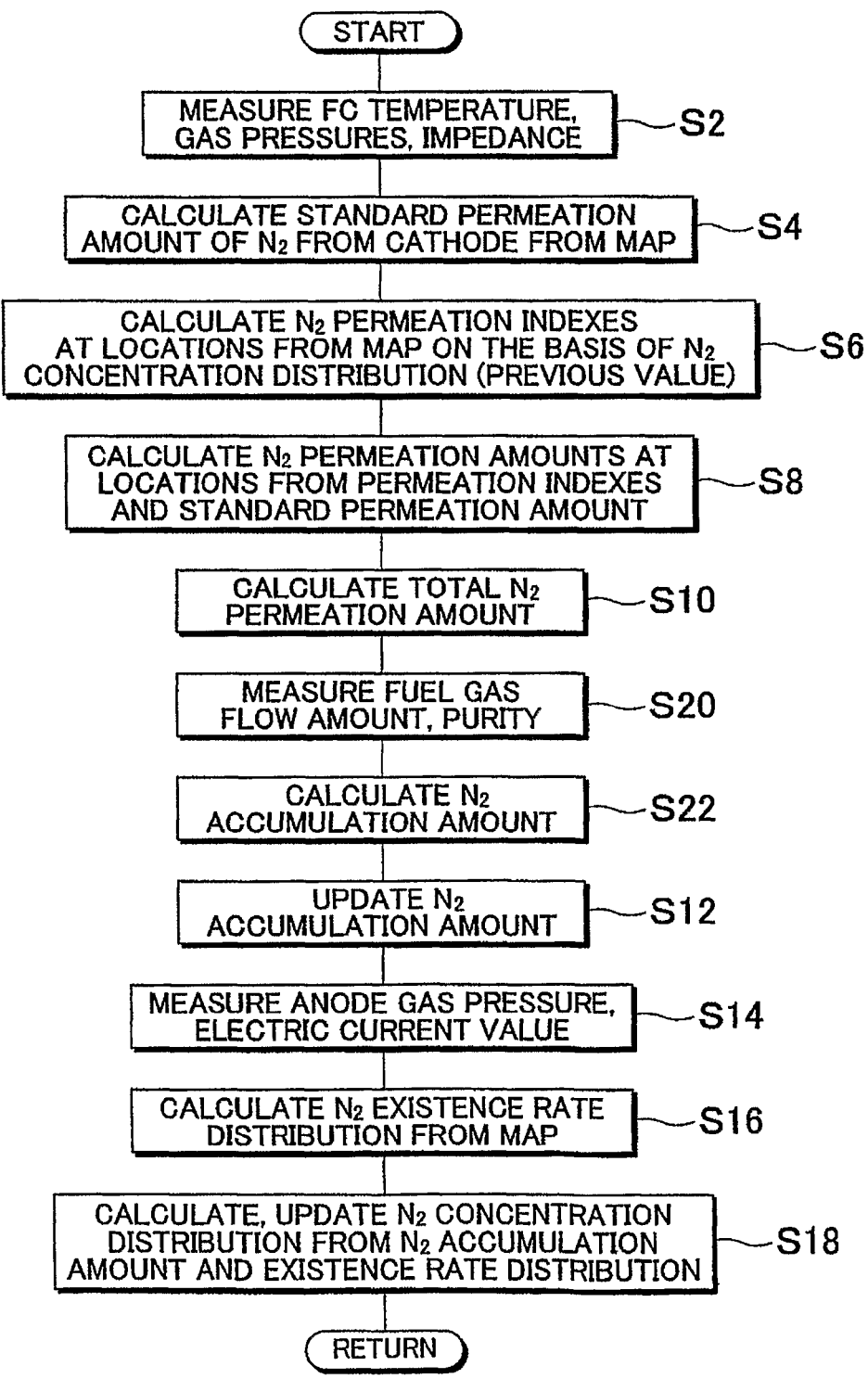
FIG. 6 is a flowchart showing a routine for estimated calculation of the nitrogen concentration distribution which is carried out in a second embodiment of the invention.

A fuel cell system of the second embodiment is realized in a construction shown in FIG. 1 by the control device 20 carrying out a routine shown in flowchart of the FIG. 6 instead of the routine shown in the flowchart of FIG. 5. The routine shown in FIG. 6 is a routine for estimated calculation of the nitrogen concentration distribution which is carried out by the control device 20 in the second embodiment. In the routine shown in FIG. 6, the processes that are the same in content as those in the routine shown in FIG. 5 are assigned with the same step numbers. In the following description, processes characteristic of the second embodiment will be predominantly described, and descriptions of the same processes as in the first embodiment will be omitted.

The estimated calculation of the nitrogen concentration distribution in accordance with the second embodiment has a feature in taking into account the nitrogen contained in the fuel gas in the hydrogen tank 4 in addition to the nitrogen passing through the membrane-electrode assembly 40. The nitrogen in the hydrogen tank 4 is a contamination that occurs at the time of generation of hydrogen as a fuel gas. Besides nitrogen, the fuel gas in the hydrogen tank 4n sometimes contains a contamination of carbon dioxide. Furthermore, in some cases, an odorant is mixed in from a safety viewpoint. Although carbon dioxide and the odorant are impurity substance that are not used for the power generation, attention is focused only on nitrogen as an impurity substance herein. However, this does not mean to exclude substances other than nitrogen from the impurity substances that are assumed in the invention.

In the routine shown in FIG. 6, the process of taking into account the nitrogen contained in the fuel cell in the estimated calculation of the nitrogen concentration distribution is a process of steps S20 and S22. In step S20, the amount of flow of the fuel gas supplied to the fuel cell 2 and the purity of the fuel gas are measured. Although the amount of flow of the fuel gas may be directly measured by a flowmeter, the value of the output current electricity of the fuel cell 2 may instead be measured. The amount of flow of the fuel gas, that is, the amount of hydrogen consumed in the anode-side gas channel 42 is univocally determined from the output electric current of the fuel cell 2. The purity of the fuel gas can be measured by a hydrogen concentration sensor (not shown).

In step S22, the amount of nitrogen that flows into the anode-side gas channel 42 together with hydrogen is calculated from the amount of flow of the fuel gas and the purity thereof measured in step S20. Then, in step S82, the amount of accumulation of nitrogen is updated using the total permeation amount of nitrogen calculated in step S10 and the amount of inflow of nitrogen calculated in step S22. By calculating the amount of accumulation of nitrogen in the anode-side gas channel 42 by taking into account the nitrogen originally contained in the fuel gas, it becomes possible to more accurately estimate the concentration distribution of nitrogen in the anode-side gas channel 42.

Other Embodiments and the Like

While the embodiments of the invention have been described above, the invention is not limited to the foregoing embodiments, but may be carried out with various modifications without departing from the gist of the invention. For example, the invention may also be carried out with the following modifications.

The first embodiment is described above in conjunction with nitrogen as an example of the impurities that pass through the membrane-electrode assembly 40. However, the estimated calculation method for the concentration distribution of an impurity substance described in conjunction with the first embodiment can also be utilized in the case where the concentration distribution of an impurity substance other than nitrogen, that is, water vapor, carbon dioxide, etc., is calculated by estimation. The second embodiment is described above in conjunction with nitrogen as an example of the impurity substance originally contained in the fuel gas. However, the estimated calculation method for the concentration distribution of an impurity substance described in conjunction with the second embodiment can also be utilized in the case where the concentration distribution of an impurity substance other than nitrogen, for example, carbon dioxide, an odorant, etc., is calculated by estimation.

Although the purity of the fuel gas is measured in the second embodiment, information about the purity of the fuel gas may be acquired from outside the system via communication. For example, in the case where the replenishment of the hydrogen tank 4 with hydrogen is performed at a hydrogen station, it suffices that information about the purity of the fuel gas be sent to the control device 20 from the station when the hydrogen tank 4 is connected to the station. In addition, in the case where the fuel gas remains in the hydrogen tank 4 at the time of replenishment of the fuel gas, it suffices that the purity after mixture of the remaining fuel gas and the replenished fuel gas be calculated from the purity of the remaining fuel gas and the purity of the replenished fuel gas, and the remaining amount and the replenished amount thereof.

Although in each of the fuel cell systems in accordance with the foregoing embodiments, the gas in the anode-side gas channel 42 is continuously emitted in small amount to the outside of the system by duty-control of the exhaust valve 14, the invention is also applicable to a so-called anode dead-end type system that is operated with the exhaust valve 14 completely closed. If in this fuel cell system, the concentration distribution of nitrogen is accurately estimated and the opening timing and the opening duration of the exhaust valve 14 are determined on the basis of the estimated nitrogen concentration distribution, it becomes possible to prevent both the decline in the fuel cell performance caused by insufficient emission and the waste of hydrogen caused by excessive emission as in the above-described continuous small-amount emission systems.

The invention claimed is:

1. A concentration distribution estimation device for a fuel cell that has an anode and a cathode on opposite sides of an electrolyte membrane and that generates electric power by being supplied with a fuel gas on the anode and being supplied with air on the cathode, the concentration distribution estimation device estimating a concentration distribution of an impurity substance in a gas channel on an anode side in the fuel cell, comprising:
    an impurity substance amount estimation device that calculates by estimation an amount of an impurity substance existing in the anode-side gas channel;
    an impurity substance distribution estimation device that calculates by estimation a distribution of an existence rate of the impurity substance in the anode-side gas channel based on gas pressure in the anode-side gas channel and a flow rate distribution of the fuel gas in the anode-side gas channel; and
    a concentration distribution calculation device that calculates the concentration distribution of the impurity substance in the anode-side gas channel as a multiplication product of the amount of the impurity substance estimated by the impurity substance amount estimation device and the distribution of the existence rate of the impurity substance estimated by the impurity substance distribution estimation device.

2. The concentration distribution estimation device according to claim 1, wherein the impurity substance distribution estimation device includes:
    a pressure measurement device that measures the gas pressure in the anode-side gas channel; a flow rate-related quantity measurement device that measures a physical quantity related to the flow rate distribution of the fuel gas in the anode-side gas channel; and an existence rate calculation device that calculates the existence rate of the impurity substance in the anode-side gas channel based on a measured value from the pressure measurement device and a measured value from the flow rate-related quantity measurement device.

3. The concentration distribution estimation device according to claim 2, wherein
    the flow rate-related quantity measurement device measures an electric current value of the fuel cell.

4. The concentration distribution estimation device according to claim 1, wherein
    the impurity substance amount estimation device includes:
    a permeation amount-related quantity measurement device that measures a physical quantity related to a permeation amount per unit area of the impurity substance permeating through the electrolyte membrane from a cathode side to an anode side;
    a standard permeation amount calculation device that calculates a standard permeation amount that is the permeation amount per unit area under a standard concentration based on a measured value from the permeation amount-related quantity measurement device;
    a permeation index calculation device that calculates a permeation index of the impurity substance in the anode-side gas channel based on the concentration distribution of the impurity substance calculated by the concentration distribution calculation device;
    a permeation amount calculation device that calculates the permeation amount of the impurity substance in the anode-side gas channel based on the standard permeation amount calculated by the standard permeation amount calculation device and the permeation index calculated by the permeation index calculation device; and
    a total permeation amount calculation device that calculates a total permeation amount of the impurity substance permeating through the electrolyte membrane based on the permeation amount in the anode-side gas channel calculated by the permeation amount calculation device.

5. The concentration distribution estimation device according to claim 4, wherein
    the permeation amount-related quantity measurement device measures impedance of the fuel cell.

6. The concentration distribution estimation device according to claim 4, wherein
    the permeation amount-related quantity measurement device measures temperature of the fuel cell.

7. The concentration distribution estimation device according to claim 4, wherein
    the permeation amount-related quantity measurement device measures the gas pressure in the anode-side gas channel and gas pressure in a cathode-side gas channel.

8. The concentration distribution estimation device according to claim 1, wherein
    the impurity substance amount estimation device includes:
    an information acquisition device that acquires information about purity of the fuel gas;
    a flow amount-related quantity measurement device that measures a physical quantity related to amount of flow of the fuel gas flowing into the anode-side gas channel; and
    an inflow amount calculation device that calculates an amount of the impurity substance flowing into the anode-side gas channel together with the fuel gas based on the information about the purity of the fuel gas acquired by the information acquisition device and a measured value from the flow amount-related quantity measurement device.

9. The concentration distribution estimation device according to claim 1, wherein
    a downstream end portion of the anode-side gas channel is substantially stopped.

10. The concentration distribution estimation device according to claim 1, wherein
    an amount of a gas that is less than an amount of the fuel gas consumed in the anode-side gas channel is emitted from a downstream end portion of the anode-side gas channel to outside a fuel cell system that includes the fuel cell.

11. A fuel cell system comprising:
    a fuel cell that has an anode and a cathode on opposite sides of an electrolyte membrane and that generates electric power by being supplied with a fuel gas on the anode and being supplied with air on the cathode;
    an exhaust mechanism that emits a gas that has passed through a gas channel on an anode side to outside the fuel cell system;
    an impurity substance amount estimation device that calculates by estimation an amount of an impurity substance existing in the anode-side gas channel based on gas pressure in the anode-side gas channel and a flow rate distribution of the fuel gas in the anode-side gas channel;

an impurity substance distribution estimation device that calculates by estimation a distribution of existence rate of the impurity substance in the anode-side gas channel;

a concentration distribution calculation device that calculates the concentration distribution of the impurity substance in the anode-side gas channel as a multiplication product of the amount of the impurity substance estimated by the impurity substance amount estimation device and the distribution of the existence rate of the impurity substance estimated by the impurity substance distribution estimation device: and a control device that controls operation of the exhaust mechanism based on the concentration distribution of the impurity substance calculated by the concentration distribution calculation device.

12. The fuel cell system according to claim 11, wherein a downstream side of the anode-side gas channel is terminated by the exhaust mechanism.

13. The fuel cell system according to claim 12, wherein the control device controls operation of the exhaust mechanism so that an amount of a gas, that is less than an amount of the fuel gas consumed in the anode-side gas channel, is emitted to outside the fuel cell system and amount of emission is changed in accordance with the concentration distribution of the impurity substance.

14. The concentration distribution estimation device according to claim 2, wherein the impurity substance amount estimation device includes:

an information acquisition device that acquires information about purity of the fuel gas;

a flow amount-related quantity measurement device that measures a physical quantity related to amount of flow of the fuel gas flowing into the anode-side gas channel; and an inflow amount calculation device that calculates amount of the impurity substance flowing into the anode-side gas channel together with the fuel gas based on the information about the purity of the fuel gas acquired by the information acquisition device and a measured value from the flow amount-related quantity measurement device.

15. The concentration distribution estimation device according to claim 2, wherein a downstream end portion of the anode-side gas channel is substantially stopped.

16. The concentration distribution estimation device according to claim 2, wherein an amount of a gas, that is less than an amount of the fuel gas consumed in the anode-side gas channel, is emitted from a downstream end portion of the anode-side gas channel to outside a fuel cell system that includes the fuel cell.

17. The concentration distribution estimation device according to claim 4, wherein the impurity substance amount estimation device includes:

an information acquisition device that acquires information about purity of the fuel gas;

a flow amount-related quantity measurement device that measures a physical quantity related to amount of flow of the fuel gas flowing into the anode-side gas channel; and an inflow amount calculation device that calculates amount of the impurity substance flowing into the anode-side gas channel together with the fuel gas based on the information about the purity of the fuel gas acquired by the information acquisition device and a measured value from the flow amount-related quantity measurement device.

18. The concentration distribution estimation device according to claim 4, wherein a downstream end portion of the anode-side gas channel is substantially stopped.

19. The concentration distribution estimation device according to claim 4, wherein an amount of a gas, that is less than an amount of the fuel gas consumed in the anode-side gas channel, is emitted from a downstream end portion of the anode-side gas channel to outside a fuel cell system that includes the fuel cell.

20. The concentration distribution estimation device according to claim 1, wherein the concentration distribution of the impurity substance is a distribution of a quantity of the impurity over a length of the gas channel on the anode side from an entrance of the gas channel to an exit of the gas channel.

21. The concentration distribution estimation device according to claim 2, wherein the distribution of the existence rate of the impurity substance is calculated from a map of the gas pressure in the anode-side gas channel and the physical quantity related to the flow rate distribution of the fuel gas in the anode-side gas channel.

* * * * *